United States Patent [19]

Antonelli et al.

[11] Patent Number: 5,773,534

[45] Date of Patent: Jun. 30, 1998

[54] PREPARING CROSSLINKABLE POLYMERS EMPLOYING MACROMONOMER CHAIN TRANSFER AGENTS

[75] Inventors: Joseph A. Antonelli, Riverton, N.J.; Charles T. Berge, Wilmington, Del.; Michael J. Darmon, Aston, Pa.; Christopher E. Murphy, Wilmington, Del.

[73] Assignee: E. I. du Pont de Nemours and Company, Wilmington, Del.

[21] Appl. No.: 746,262

[22] Filed: Nov. 7, 1996

Related U.S. Application Data

[63] Continuation-in-part of Ser. No. 455,756, May 31, 1995, abandoned, which is a continuation of Ser. No. 887,626, May 22, 1992, abandoned.

[51] Int. Cl.$^6$ .............................. C08F 2/38; C08F 24/00; C08F 30/08; C08F 20/54; C08F 20/08
[52] U.S. Cl. ........................... 526/82; 526/273; 526/279; 526/303.1; 526/310; 526/317.1
[58] Field of Search ................................... 526/303.1, 82, 526/273, 279, 310, 317.1

[56] References Cited

U.S. PATENT DOCUMENTS 3,672,889  6/1972  Baltazzi et al. .......................... 96/1.8
4,547,323  10/1985  Carlson .................................. 260/465.4

FOREIGN PATENT DOCUMENTS 3-161592  7/1991  Japan .

OTHER PUBLICATIONS

Cacioli et al, Copolymerization of ω–Unsaturated Oligo(M-ethyl Methacrylate): New Macromonomers, *J. Macromol. Sci.–Chem.*, A–23(7), 839–852, 1986.

H. Tanaka, H. Kawai, T. Sato, and T. Ota, Journal of Polymer Science: Part A: Polymer Chemistry 27, 1741–1748, 1989.

*Primary Examiner*—James J. Seidleck
*Assistant Examiner*—Wu C. Cheng
*Attorney, Agent, or Firm*—James Costello

[57] ABSTRACT

An improved method of free radical polymerization conducted in the presence of a relatively low molecular weight macromonomer such as can be made with a metal chelate chain transfer catalyst. This method has various uses, including reducing the molecular weight of a variety of crosslinkable polymers and copolymers.

30 Claims, No Drawings

PREPARING CROSSLINKABLE POLYMERS EMPLOYING MACROMONOMER CHAIN TRANSFER AGENTS

CROSS-REFERENCE TO RELATED APPLICATIONS

This application is a continuation-in-part of application Ser. No. 08/455,756 filed on 31 May 1995 now abandoned which was a continuation of application Ser. No. 07/887,626 filed on 22 May 1992, now abandoned.

FIELD OF THE INVENTION

This invention relates to polymerization to obtain a crosslinkable polymer. The invention is particularly useful for preparing polymers for coatings and other curable compositions. The invention employs ω-unsaturated macromonomers as a chain transfer agent. Such macromonomers have a variety of uses, including controlling the molecular weight of polymers.

BACKGROUND OF THE INVENTION

In any polymerization process, it is necessary to be able to control the molecular weight of the polymer produced so that it may be fitted to a particular use or need. For example, in unperturbed polymerization systems which fundamentally tend to produce high molecular weight polymers, it may be desirable or necessary to limit the molecular weight of the polymers produced, and this must be done in a fairly predictable and controllable fashion. Such molecular weight limitation may be desirable or necessary in the preparation of polymer solutions for use in paints and finishes which require high solids content to assure reduced solvent emission during application and yet which require low viscosity to facilitate ready application.

In free radical polymerizations, there are a number of conventional means of effecting such molecular weight limitation. These, along with notable disadvantages or problems, include (1) A high initiator/monomer ratio. However, this may be costly in terms of initiator consumption. Also, high initiator levels may also produce undesirable end groups on the polymers produced.

(2) Polymerization at high temperatures. However, this may lead to undesirable depropagation, thermal initiation, and undesirable secondary reactions.

(3) Adding stoichiometric amounts of thiol chain transfer agents to the polymerizing system. However, the attendant incorporation of sulfur-containing agents into the polymer may render it less durable than is desired. There may also be odor problems associated with the use of sulfur-containing chain transfer agents.

(4) Chain transfer agents employing cobalt (II) chelates such as disclosed in U.S. Pat. No. 4,680,352 and U.S. Pat. No. 4,694,054. However, a possible disadvantage of these is that some do not work in water and some are adversely affected or deactivated by low pH. They may cause color problems, especially if interaction with some monomers may require higher levels of the cobalt chelate.

(5) Group transfer agents such as disclosed in U.S. Pat. Nos. 4,417,034 and 4,414,372 or European patent application publication 0,248,596. However, they are specific to methacrylated polymers and relatively expensive. They are also sensitive to certain monomers and impurities which contain active hydrogens, e.g., hydroxyl, carboxyl, carboxylic acid, or amine. Special solvents may be required and blocked hydroxyl and carboxyl monomers may be needed which require a special de-blocking step to activate the protected group.

The use of terminally or w-ethylenically unsaturated oligomers or macromonomers as chain transfer agents as a means of controlling molecular weight of certain polymers in some contexts is known. There have been a number of studies and articles on macromonomers acting as chain transfer agents.

Macromonomers are known, for example, as disclosed in U.S. Pat. No. 4,547,327; U.S. Pat. No. 4,170,582; U.S. Pat. No. 4,808,656, Japanese patent 3,161,562; Japanese patent 3,161,593. See also, P. Cacioli, et al., *J. Makromol. Sci.-Chem.*, A23 (7), 839–852 (1986) and H.Tanaka, et al., *Journal of Polymer Science; Part A*; Polymer Chemistry, 27, 1741–1748 (1989).

It is an object of this invention to provide a method of

It is a further object to control the molecular weight of the polymer or copolymer produced.

The present invention avoids problems associated with chain transfer agents previously used commercially, for example in the production of coatings and finishes. The present method has a number of significant advantages, including lower polymerization temperatures, reduced initiator costs, and less color. The resulting polymer and compositions may exhibit improved durability. The present method thus has the advantage of reducing the variables that narrow the utility of common chain transfer agents or techniques that are commonly used. This method also provides the introduction of acceptable monomer units into the polymer that are commonly considered, by those knowledgeable in the art, as contributing a neutral to positive effect toward artificial and natural weathering durability.

Yet another object is to provide an improved method of obtaining a final polymer based product less subject to ultraviolet degradability, making them useful in many applications, such as in paints and finishes. Other applications are in the area of imaging, electronics, for example photoresists, engineering plastics, and polymers in general.

These and other objects will become apparent hereinafter.

SUMMARY OF THE INVENTION

The present invention provides an improved free radical polymerization of a plurality of monomer species, some of which carry functional groups to provide crosslinking sites for the resulting copolymer. Polymerization occurs in the presence of a chain transfer agent, the improvement characterized in that the chain transfer agent is an ω-unsaturated macromonomer, as defined below. The polymer produced has functional groups for crosslinking. In a further aspect of the present invention, the polymers so produced have been found to have improved properties for use in coatings, especially finishes and paints.

DETAILED DESCRIPTION OF THE INVENTION

This invention is directed to a method of free radical polymerization of a desired monomer composition, to produce a wide variety of polymers or copolymers made from olefins such as ethylene, propylene or butadiene, halogenated vinyls such as vinyl chloride or vinyl fluoride, vinylidene fluoride, vinyl ether, tetrafluoroethylene, styrene, acrylic or methacrylic acids and their esters or amides, chloroprene, vinyl acetate, acrylonitrile, and/or mixtures thereof In the case of acrylic or methacrylic polymers, the monomer composition comprises monomers which are esters of acrylic acid or methacrylic acid. At least a portion of the comonomers carry reactive functional groups which can serve as crosslinking sites.

By "reactive functional group(s)"("reactive functionality") is meant an X group having at least one reactive crosslink site. By "reactive crosslink site" is meant a vinyl molecule comprising (i) carboxylic acid or amide, or (ii) an ester or unsubstituted aryl as well as a moiety selected from epoxy, hydroxy, isocyanato, amino, anhydride, amide, carboxylic acid, silyl, cyano, halo, and the like. One skilled in the art will appreciate that the latter definition does not include a group wherein x is wholly ester or unsubstituted aryl.

The invention may be useful, among other things, for controlling or reducing the molecular weight of the polymer or copolymer so produced. The invention is also useful for placing functional groups at the ends of polymers, for example to produce telechelics or pseudo-telechelics. Other significant uses are explained in detail below.

The method of the present invention employs, as a free radical chain transfer agent, the use of relatively low molecular weight macromonomers, having w-unsaturation, which macromonomers may itself be made with a metal chelate chain transfer catalyst. Such macromonomers are compounds that are typically comprised of at least two monomer units. However, although less preferred, it is contemplated that w-unsaturated macromonomers might also be prepared without polymerization, according to a known or routine organic synthesis.

The macromonomer chain transfer agents employed in the present invention may be a pure compound or a polydisperse mixture of compounds. These materials have utility either alone or as blends when used as chain transfer agents for virtually any free radical polymerization.

Preferably, the present chain transfer agents are used as a polydisperse mixture, which mixture has a distribution of molecular weights having a very low degree of polymerization, i.e., DP=2 to 100, preferably 2 to 20, and most preferably 2 to 7. For each particular macromonomer compound, n is an integer.

The macromonomers of interest, as well as the polymers produced thereby, include those having the following end group:

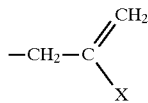

where X is —CONR$_2$, —COOR, OR$^1$, —OCOR, —OCOOR$^1$, —NRCOOR$^1$, halo, cyano, or a substituted or unsubstituted phenyl or aryl, wherein each R is independently selected from the group of hydrogen, silyl, or a substituted or unsubstituted alkyl, alkyl ether, phenyl, benzyl, or aryl, wherein said groups may be substituted with epoxy, hydroxy, isocyanato, cyano, amino, silyl, acid (—COOH), halo, or acyl; and wherein R$^1$ is the same as R except not H; wherein each alkyl is independently selected from the group consisting of branched, unbranched, or cyclical hydrocarbons having 1 to 12, preferably 1–6, and most preferably 1–4 carbon atoms; halo or halogen refers to bromo, iodo, chloro and fluoro, preferably chloro and fluoro, and silyl includes —SiR$^2$(R$^3$)(R$^4$) and the like, wherein R$^2$, R$^3$, and R$^4$ are independently alkyl, phenyl, alkyl ether, or phenyl ether, preferably at least two of R$^2$, R$^3$, and R$^4$ being a hydrolyzable group, more preferably two of which are alkyl ether, wherein alkyl is as defined above, preferably methyl or ethyl. A plurality of silyl groups may be condensed, for example, an organopolysiloxane such as —Si(R$^2$)$_2$—O—Si(R$^3$)$_2$R$^4$, wherein R$^2$, R$^3$, and R$^4$ are independently alkyl. See U.S. Pat. No. 4,518,726 for silyl groups in general.

A preferred class of macromonomers for use in the present invention are those macromonomers according to above structure in which X is —CONR$_2$, —COOR, unsubstituted or substituted phenyl, aryl, halo, or cyano, and R is as defined above.

A more preferred class of macromonomers for use in the present invention are those macromonomers according to above structure in which X is —COOR or phenyl and R is alkyl or phenyl unsubstituted or substituted with epoxy, hydroxy, alkoxysilyl or hydrogen.

The macromonomers employed in the present invention are to be distinguished from the more conventional macromonomers having the following end group:

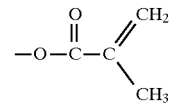

Preferably, the macromonomers employed in the present invention, as well as the polymers produced thereby, are characterized by the following end group:

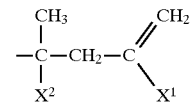

wherein X$^1$ and X$^2$ are independently (the same or different) X as defined above.

The general chemical structure of suitable macromonomers for use in the present invention is described below where n=2 to 100 on average.

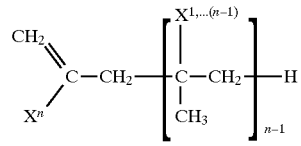

wherein X$^1$ to X$^n$ is independently defined as above for X and n is on average 2 to 100, preferably 2 to 20.

For example, a general formula for a methacrylate macromonomer is as follows:

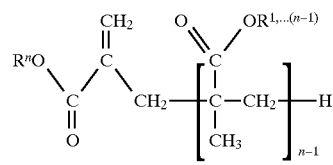

wherein R$^1$ to R$^n$ are independently (the same or different) and defined as above for R and n is on average 2 to 20, preferably 2 to 7.

As a further very specific example, a methyl methacrylate trimer, wherein n equals 3 and R equals —CH$_3$, is as follows.

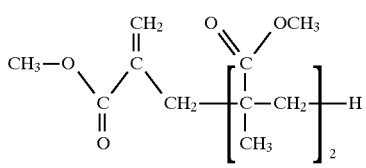

As indicated above, dimers, trimers, tetramers, etc., as defined above, or mixtures thereof, are suitably employed in the present invention. Mixtures of varying molecular weight are probably easier to prepare in large quantities. A wide range of molecular weight oligomers may be made, which in turn may be distilled to obtain a purer or pure oligomer, for example the tetramer. The macromonomers do not have to be in any particular form. The macromonomers may be stored and added in bulk, as liquids or solids, mixed in a solvent, mixed with monomers.

Many of the macromonomers, that can be employed in the present process, are known, for example as taught in Janowicz published European Patent Application 0,261,942, herein incorporated by reference. The alpha-methyl styrene dimer, which is the same as the compound 2,4-diphenyl-4-methyl-1-pentene, is known as a chain transfer agent, although its preparation by a polymerization process, for example a metal chelate chain transfer process, or its inclusion in a molecular weight distribution is not believed conventional. The claimed invention does not include the use of the pure dimer, i.e. a compound according to the above formula when n is 2 and X is phenyl, but does not exclude a distribution of such macromonomers that may include that particular compound. However, chain transfer agents with such a phenyl or aryl group may be less preferred for reasons of the properties of the resulting polymers as a consequence of the presence of aromatic end groups derived from the chain transfer agent.

According to the present invention, suitable macromonomers are dimers, trimers, tetramers, and higher oligomers of monomers. Thus, macromonomers comprising branched, unbranched or cyclical methacrylates such as methyl, ethyl, propyl, butyl, 2-ethylhexyl, and/or decyl methacrylate; cyclohexyl, phenyl, or benzyl methacrylate; glycidyl methacrylate, hydroxyethyl or hydroxypropyl methacrylate, methacrylic acid, methacrylonitrile, methacrylamide, 2-isocyanatoethyl methacrylate, dimethylaminoethyl methacrylate, N,N-dimethylamino-3-propyl methacrylamide, t-butylaminoethyl methacrylate, and silanes such as methacryloxypropyltrimethoxysilane, or mixtures of the foregoing, and numerous others can be employed. Hetero macromonomers, as for example, the reaction product of methylmethacrylate and methacrylonitrile are suitable. These macromonomers are most easily made by a metal chelate catalytic chain transfer, for example a cobalt chelate, as will be explained below, but they could be made by other methods as well.

The present macromonomers can be used, for example to control molecular weight during polymerization of acrylic and other monomers, in an effective amount of only a few percent by weight of the macromonomer present in the monomer mixture. A suitable range of macromonomer chain transfer agent is between 0.01% and 80% by weight, preferably about 0.1 to 40%, and most preferably 1 to 10% by weight of the monomer reactants. For bulk or bead polymerization, where in some cases it may be desired to bring down the molecular weight only slightly from its unregulated molecular weight, then only 0.001 to 5% of the macromonomer chain transfer agent may be suitable.

The polymers made according to the present invention have wide utility, including use in coatings and sealants, basically wherever one skilled in the art would use a low molecular weight, low dispersity polymeric material. With respect to coatings in which durablity is desired, polymers and compositions thereof, made according to the present invention, can have advantageous properties associated with the above mentioned end groups. For example, the QUV performance of clears thusly made may be improved compared to clears made with an alternative method such as high initiator level, high temperature, or alternative chain transfer agents. The miscibility and/or viscosity differences may also be improved. Hence, polymers can be made without the deleterious moieties that enter from alternative methods of molecular weight control.

Although applicants do not wish to be bound by any theory, it is believed that, when employing the present macromonomer chain transfer agents, the attendant molecular weight control occurs because the macromonomer can, in addition to copolymerizing normally, also undergo a beta-scission reaction. This beta-scission reaction causes part of a macromonomer molecule to become attached to the other end of the growing polymer molecule, thus terminating its growth. The detached portion of the macromonomer, now containing a free radical center, propagates by addition to free monomers in the reaction system. To the extent that normal copolymerization is also taking place, there will be additional macromonomer units randomly incorporated along the polymer chain. If beta-scission is made to predominate over normal copolymerization, then telechelic polymers having a functional group attached to the end of the polymer may be produced at high levels. Although illustrated with a particular X group, from the above formula, the following kind of reaction mechanism is believed to occur.

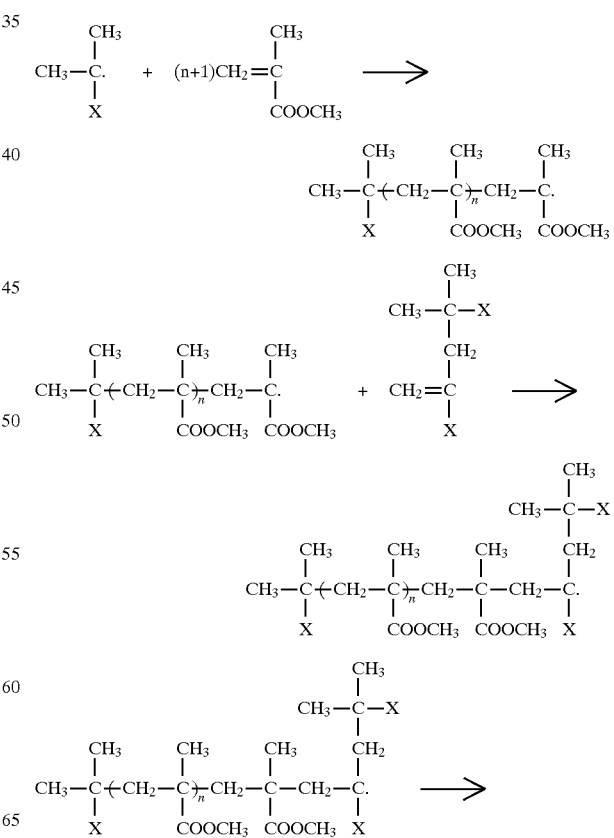

-continued

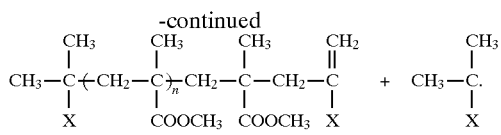

The present invention is directed to free radical polymerization of unsaturated monomers, some of which carry functional groups for later crosslinking. This includes polymerization such as occurs in suspension, emulsion or solution polymerization, in aqueous or organic media, as will be familiar to those skilled in the art.

Polymerization may be a batch process in which the monomers, initiator and media are loaded into the reactor and heated to an effective polymerization temperature. In a batch process, the reaction may be run under pressure to avoid monomer reflux and the medium can be viewed as absorbing the reaction heat.

The macromonomers employed in the present invention are typically prepared by standard solution polymerization techniques, but may also be prepared by emulsion, suspension or bulk polymerization processes. Preferably, a metal chelate chain transfer catalyst is employed in the method of preparation. Such a method is disclosed in the above mentioned U.S. Pat. No. 4,680,352, issued to Janowicz et al. and U.S. Pat. No. 4,694,054, issued to Janowicz. both of which are commonly assigned and hereby incorporated by reference in their entirety. To obtain some of the relatively lower molecular weight macromonomers of the present invention, one could employ higher amounts of a metal chelate chain transfer agent. The same prior art process can be used in making the present relatively low molecular weight macromonomers or oligomers, such as dimers and trimers. In effect, one chain transfer agent is used to make another chain transfer agent.

An initiator which produces carbon-centered radicals, sufficiently mild not to destroy the metal chelate chain transfer agent, is typically employed in preparing the macromononmers. Azo compounds, as described below, are suitable initiators.

The method of making the present macromonomers can employ a wide variety monomers and monomer mixtures.

The kind of reaction sequence which is preferably employed for preparing the present macromonomer chain transfer agents, although with reference to the particular case where X is —COOCH3 in the above formula, is illustrated as follows.

$$CH_3-\underset{X}{\underset{|}{\overset{CH_3}{\overset{|}{C}}}}\cdot \quad + \quad (n+1)CH_2=\underset{COOCH_3}{\underset{|}{\overset{CH_3}{\overset{|}{C}}}} \longrightarrow$$

$$CH_3-\underset{COOR}{\underset{|}{\overset{CH_3}{\overset{|}{C}}}}(CH_2-\underset{COOCH_3}{\underset{|}{\overset{CH_3}{\overset{|}{C}}}})_n CH_2-\underset{COOCH_3}{\underset{|}{\overset{CH_3}{\overset{|}{C}}}}\cdot$$

$$CH_3-\underset{COOCH_3}{\underset{|}{\overset{CH_3}{\overset{|}{C}}}}(CH_2-\underset{COOCH_3}{\underset{|}{\overset{CH_3}{\overset{|}{C}}}})_n CH_2-\underset{COOCH_3}{\underset{|}{\overset{CH_3}{\overset{|}{C}}}}\cdot \quad + \quad M \longrightarrow$$

$$CH_3-\underset{COOCH_3}{\underset{|}{\overset{CH_3}{\overset{|}{C}}}}(CH_2-\underset{COOCH_3}{\underset{|}{\overset{CH_3}{\overset{|}{C}}}})_n CH_2-\underset{COOCH_3}{\underset{|}{\overset{CH_2}{\overset{||}{C}}}} \quad + \quad MH$$

-continued

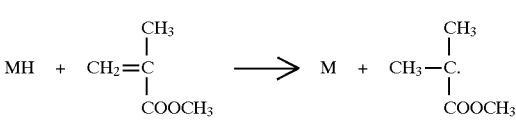

wherein "M" is a metal chelate catalytic chain transfer agent such as one of the cobalt complexes known to those of skill in the art.

As will be apparent to one skilled in the art, these macromonomers could also be prepared in situ from appropriate reactants, although they are preferably made separately and then added to the polymerization reaction mixture.

The polymerization process according to the present invention, in which polymers or copolymers are produced employing the above described macromonomer chain transfer agents, is suitably carried out at 20° to 200° C., preferably 40°–160° C., more preferably 50°–145° C.

Any source of radicals or any of the known class of polymerization initiators is suitable, provided the initiator has the requisite solubility in the solvent or monomer mixture chosen and has an appropriate half life at the temperature of polymerization. Polymerization initiators may be redox or thermally or photochemically induced, for example azo, peroxide, peroxyester, or persulfate. Preferably, the initiator has a half life of from about 1 minute to about 1 hour at the temperature of polymerization. Some suitable initiators include ammonium persulfate, azocumene; 2,2'-azobis(2-methyl)butanenitrile; 4,4'-azobis(4-cyanovaleric acid); and 2-(t-butylazo)-2-cyanopropane. Other non-azo initiators having the requisite solubility and appropriate half life may also be used.

The polymerization process can be carried out as either a batch, semi-batch, continuous, or feed process. When carried out in the batch mode, the reactor is typically charged with macromonomer and monomer, or medium and monomer. To the mixture is then added the desired amount of initiator, typically such that the M/I (monomer to initiator) ratio is 10 to 200. In typical examples, the macromonomer chain transfer catalyst is added in the amount such that the catalyst/initiator or C/I ratio is in the range of 0.10 to 20. The mixture is heated for the requisite time, usually one-half hour to ten hours.

If the polymerization is to be carried out as a feed system, the reaction is typically carried out as follows. The reactor is charged with medium, typically an organic solvent. Into a separate vessel are placed the monomer and macromonomer. In a separate vessel is added initiator and medium. The medium in the reactor is heated and stirred while the monomer and macromonomer solutions are introduced, for example by a syringe pump or other pumping device. The rate of feed is determined largely by the quantity of solution. When the feed is complete, heating may be continued for an additional half hour or more.

In either type of process, the polymer may be isolated by stripping off the medium and unreacted monomer or by precipitation with a non-solvent. Alternatively, the polymer solution may be used as such, if appropriate to its application.

The polymerization process is suitably carried out with a variety of monomers in the reaction mixture employed to form the polymer product. For example, methacrylate and acrylate ester monomers and styrene may be included, Methacrylates which are useful in this invention include branched, non-branched, or cyclical alkyl esters of $C_1$ to $C_{12}$ alcohols and methacrylic acid, for example, methyl and ethyl methacrylate. Other monomers include, but are not restricted to, allyl, alkoxysilyl, glycidyl, hydroxyalkyl (for example, hydroxyethyl and hydroxypropyl), allyloxyethyl, and mono or dialkylaminoalkyl methacrylates, wherein the alkyl is suitably has 1 to 12 carbon atoms, preferably 1 to 8, most preferably 1 to 4 carbon atoms.

Other monomers that can be polymerized according to the present process include tetrafluoroethylene, vinyl chloride, styrene, vinyl fluoride, vinylidene fluoride, propylene, ethylene, vinyl ethers, vinyl esters, anhydrides of maleic or itaconic and their acids, and the like. The invention has wide applicability in the field of free radical polymerization and may be used to produce polymers and compositions having many uses. The polymers produced thereby may exhibit improved durability, including improved resistance to ultraviolet degradability. Such polymers may be used in coatings, including clearcoats and basecoat finishes or paints for automobiles and other vehicles or maintenance finishes for a wide variety of substrates. Such coatings may further include pigments, durability agents, corrosion and oxidation inhibitors, sag control agents, metallic flakes, and other additives. Additional applications are in the fields of imaging, electronics, for example photoresists, engineering plastics, adhesives, sealants, and polymers in general.

As indicated above, the polymerization can be carried out either in the absence of, or in the presence of, a polymerization medium. Many common organic solvents are suitable as polymerization media. These include aromatic hydrocarbons, such as benzene, toluene and the xylenes; ethers, such as tetrahydrofuran, diethyl ether and the commonly available ethylene glycol and polyethylene glycol monoalkyl and dialkyl ethers, including the Cellosolves and Carbitols; alkyl esters of organic acids and mixed ester-ethers, such as monoalkyl ether-monoalkanoate esters of ethylene glycol. In addition, ketones, such as acetone, butanone, pentanone and hexanone are suitable, as are alcohols such as methanol, ethanol, propanol and butanol. It may be advantageous to use mixtures of two or more solvents. Certain solvents may be preferred for environmental or toxicological reasons.

The invention has several significant uses. According to one aspect of the present invention, free radical polymerization, in organic medium, water or bulk, of a combination of different monomers is carried out, where the reaction mixture comprises:

(a) at least one monomer, in addition to unsaturation, having a reactive functional group and (b) an effective amount of a macromonomer which has the required end group structure, for example as obtained via cobalt chain transfer.

Suitable reactive functional groups include, for example, —OH, COOH, epoxy, silyl, amino, amide, acetoacetoxy, anhydride, isocyanato, cyano, halo, and the like, as well as combinations thereof The reaction mixture being polymerized suitably comprises 0.1 to 100 percent, by weight, preferably 2 to 60 percent, more preferably 10 to 50%, and most preferably 20 to 40 percent, by weight, monomers carrying such crosslinkable or reactive sites. The monomers may comprise typical monomers or macromonomers themselves made from monomer units or having bulky pendant groups.

The crosslinkable polymer products according to the present invention suitably has a number average molecular weight per functional group of 70 to 6000, preferably 200–2000, and most preferably 200–1000. Such crosslinkable polymers are useful in a variety of applications including curable binders in coatings, crosslinkers, pigment dispersants, and adhesives.

The product of this polymerization is especially useful in crosslinkable or curable compositions, for example thermoplastic coatings useful as paints, finishes or protective films. The composition may comprise a self-crosslinkable binder, for example, silane or isocarbodiimide. Alternatively, such compositions may comprise, by weight of (a) and (b) below:

(a) 5 to 60 percent, preferably 20 to 40 percent of a crosslinking agent and (b) 40 to 95 percent, preferably 80 to 60 percent of a functional polymer made by the present process of polymerizing a functional monomer in the presence of a macromonomer having the required end group structure.

Such a composition may be used in pigmented or unpigmented coatings. In automotive finishes, it is typical to apply a clearcoat over a basecoat where either the basecoat or clearcoat. According to the present invention, one or more of the polymers contained in the basecoat, clearcoat, or both may be made by polymerization of monomers in the presence of a macromonomer having an end group structure of the type required for the chain transfer effect according to the present method of polymerization. This would include the process of applying clearcoat over a basecoat where either the basecoat or clearcoat is an aqueous or solvent-based composition.

In another aspect of the present invention, in consequence of the above-mentioned beta-scission reaction that occurs when an effective amount of macromonomer is present, it is possible for every polymer molecule produced to have one carbon-carbon double bond that can copolymerize with other monomers. Thus, the presently defined macromonomers can be used, according to another aspect of the present invention, to make a macromonomer product. It is especially useful for preparing acrylic, vinyl terminated macromolecules. A key feature is the utilization of the above-defined low molecular weight macromonomers as radical chain transfer agents in the polymerization of the desired monomer composition. The chain transfer agent is thus used to control molecular weight as well as providing a route to vinyl or ethylenically terminated macromolecules.

A significant advantage of this method of preparing vinyl terminated macromolecules is that a wide variety of monomers can be polymerized without adversely affecting the molecular weight of the desired macromonomer product. As indicated earlier, typical methods of preparation of vinyl terminated macromolecules are subject to sensitivity to active proton containing monomers. An example would be cobalt porphorine and dioxime catalysts. U.S. Pat. No. 4,680,352 and subsequent patents to Janowicz et al. demonstrate typical examples. Such cobalt catalysts are used extensively to prepare vinyl terminated macromolecules, but have the disadvantage of not working well with hydroxyl and/or carboxyl containing monomer when used at low levels. Also, high level use of these catalaysts may produce unacceptable color in the resin. In general, cobalt catalysts are less efficient with acrylate monomers.

In another aspect of the present invention, it is possible to produce terminally functional polymers. This is accomplished by the presence, in the reaction mixture, of a macromonomer which has at least one reactive functional group, for example, —OH, —COOH, epoxy, isocyanato, amide, amine, silyl, and the like.

The key feature, according to this aspect of the invention, is utilization of very low molecular weight w-unsaturated macromonomers, made from functional group containing monomers, as radical chain transfer agents in the polymerization of a desired monomer composition. The chain tranfer agents is thus used to control molecular weight as well as providing a route to terminally functionalized macromolecules. In the chain transfer step, the propagating radical will contain the desired functional group, thus providing an initiating terminus with functionality also. When using an initiator containing the desired functional group, the polymers produced will have a higher degree of functionality at both terminus.

Telechelical polymers, those containing reactive functional groups only at termini of the polymer, can be made by the method of this invention. For example, a hydroxy terminated polymer of methyl methacrylate, having a molecular weight ($M_n$) of 2000 (DP=20), can be produced by polymerizing methyl methacrylate monomer with a hydroxyl containing radical initiator; for example: 2,2' azobis(2-methyl-n-(2-hydroxyethyl)propionamide), in the presence of a macromonomer made from hydroxyethyl methacrylate having a DP equal to 2. The chain transfer process, by definition, terminates the growing radical chain. A specific end group is placed at the end of the polymer which in this case is a hydroxyethyl methacrylic group. In concert with this transfer, a hydroxymethacrylate radical is produced, which becomes the new propagating radical.

Pseudo-telechelics are polymers defined as telechelical in nature, but also having low levels of functional monomers as comonomers. For example according to the above example, there would be hydroxyethyl methacrylate with the methylmethacrylate monomer. These polymers are useful in coatings applications that use functional groups as cross-linking sites. This method would then insure that a very high percentage of the polymers would containg at least two cross-linkable sites. This is particulary important with low molecular weight polymers.

The advantage of this method of preparation of telechelical macromolecules is that a wide variety of monomers can be polymerized without adversely affecting the molecular weight of the desired polymer. Readily available monomers can be used to generate the macromonomer chain transfer agents.

Thus, according to one aspect of the present invention, terminally functional polymers such as telechelics and/or pseudo-telechelics can be prepared advantageously and inexpensively. As a result, lower molecular weight polymers may be allowed, which in turn can help with VOC (volatile organic compounds) problems. By having reactive sites at one or both ends, crosslinking is very effective. There is also, if desired, a lower probability of multiple functional monomers per polymer, which in turn can help to lower the cost of more expensive functional monomers.

In another aspect of the present invention, block copolymers may be produced if the above mentioned beta-scission is made to predominate. Thus, for example, the presence during polymerization, of a macromonomer consisting of 20 glycidyl methacrylate monomer units would put a sequence of 19 glycidyl methacrylate units on one end of the polymer molecule and a single glycidyl group on the other end. Block polymers of this type have a variety of uses, as the skilled artisan will readily appreciate, For example, such block polymers are useful in making pigment dispersants.

Such a method of preparting block polymers is advantageous in that indirect use of cobalt chain transfer agents avoids any problems with the latter compounds and may also be less expensive, since the present oligomers may be made in bulk.

This method is especially useful for preparing acrylic block co-polymers. The key feature is the utilization of w-unsaturated or vinyl terminated macromonomers, made from monomers required for one of the desired blocks in the block polymer, as a free radical chain transfer agent in the polymerization of a desired monomer composition for the other block. The chain transfer agent is thus used to control molecular weight as well as providing a route to block co-polymers.

For example, if the vinyl terminated macromolecule is polymethylmethacrylate, with a DP=10.5 ($M_n$=1050), then this will provide a methyl methacrylate (MMA) block with a DP=9.5 (with a loss of 1.0 DP during the chain transfer step). Using this in the synthesis of a MMA/BMA (60/40 block co-polymer; $M_n$=1580) the "A" block (MMA or methyl methacrylate) would have a DP=9.5 and the "B" block (BMA or butyl methacrylate) would have a DP=4.5.

The advantage of this method of preparation of block co-polymers is that a wide variety of monomers can be polymerized without adversely affecting the molecular weight of the desired polymer. Readily available monomers can be used to generate the macromonomer chain transfer agent which later become the "A" block in the synthesis.

The following examples demonstrate the method of the present invention. Unless indicated otherwise, all parts are by weight and all molecular weights are based on a polystyrene standard.

EXAMPLES 1–3

Examples 2 and 3 illustrate an emulsion polymerization process according to the present method, with Example 1 being a control. Varying amounts X, by weight of reaction mixture, of the macromonomer chain transfer agent are employed. The overall reaction composition, by weight, is BMA/2EHMA/HEMA/MAA/methacrylamide/oligomeric pMMA in the respective ratio of 30-X: 61:3:3:3:X, wherein BMA is butyl methacrylate, 2EHMA is 2-ethylhexyl methacrylate, HEMA is hydroxyethyl methacrylate, MMA is methyl methacrylate, and pMMA is a polymethylmethacrylate macromonomer of the kind described by the general formula above and having an number average molecular weight (hereafter $M_n$) of 316 and a polymer dispersity or $M_w/M_n$ (hereafter D) of 1.31. The polymerization initiator is ammonium persulfate. The following components were employed in the polymerization.

|  | Parts by weight |
|---|---|
| Part 1 |  |
| Demineralized Water | 250.94 |
| TREM LF-40 | 1.33 |
| Dupanol WAQE | 1.11 |
| Part 2 |  |
| Demineralized Water | 32.64 |
| Ammonium persulfate | 0.76 |
| Part 3 |  |
| Butylmethacrylate | 90.52-X |
| 2-Ethythexyl methacrylate | 184.05 |
| Hydroxyethyl methacrylate | 9.05 |
| Methacrylamide | 9.05 |
| Methacrylic acid | 9.05 |
| Oligomeric pMMA | X |
| TREM LF-40 | 3.80 |
| DUPANOL WAQE | 3.11 |
| Demineralized Water | 181.87 |
| Part 4 |  |
| Demineralized Water | 80.88 |
| TOTAL | 858.16 |

In the above list, TREM LF-40 is sodium dodecyl allyl sulfosuccinate (40%) in water and DUPANOL WAQE is sodium lauryl sulfate (30%) in water are commercially available emulsion stabilizers.

Part 1 is charged into a 2 liter reactor, mixed to dissolve and heated to 185°–187° F. Part 2 is charged into an initiator feed vessel in order, mixed and dissolved. Part 3 is charged into the monomeric feed vessel in order, without mixing. The contents of Part 3 are preemulsified and adjusted to an emulsion temperature of 80°–85° F. Polymerization is started by adding 5% of Part 3 into the reactor in a single shot. The reactor temperature is stabilized to 185°–187° F. and all of Part 2 (initiator solution) is added in a single shot. The temperature of the reactor will rise. When stable, the remainder of Part 3 is added over 90 minutes. The reactor temperature is controlled to 190°–194° F. After completing the addition of Part 3, the reactor is held at a temperature of 190°–194° F. for 60 minutes, cooled to 100° F., and Part 4 is added over 5 minutes.

The solids content of the product is 35.35%. The results for the product obtained in each of examples 1 to 3 are shown in Table 1 below. This Table demonstrates that low level additions of the oligomeric pMMA is an effective chain transfer agent, in an aqueous system, which efficiently reduces the molecular weight of the latex from an undeterminable molecular weight thought potentially having an Mn greater than 100,000 to an Mn below 12,000. Table 1 also demonstrates that the molecular weight reduction has little or no effect on mean particle size of the latex.

|  | Parts by weight |
|---|---|
| Part 3 | |
| Butyl methacrylate | 90.52-X |
| 2-Ethylhexyl methacrylate | 184.05 |
| Hydroxyethyl methacrylate | 9.05 |
| Methacrylamide | 9.05 |
| Methacrylic acid | 9.05 |
| Oligomeric pMMA (Example 7 & 8) | X |
| TREM LF-40 | .80 |
| DUPANOL WAQE | 3.11 |
| Demineralized water | 181.87 |
| Part 4 | |
| Demineralized Water | 80.88 |
| TOTAL | 858.16 |

Part 1 is charged into a 2 liter reactor, mixed to dissolve and heated to 185°–187° F. Part 2 is charged into an initiator feed vessel in order, mixed and dissolved. Part 3 is charged

TABLE 1

BMA/2EHMA/HEMA/MAA/METHACRYLAMIDE/OLIGOMERIC pMMA (BY WEIGHT)
30-X:61:3:3:3:X

| EXAMPLE | OLIGOMER CTA ($M_n$ = 316; D = 1.31) | X | Mn | Mw | Dispersity | Particle Size Mean diam. | St. Dev. |
|---|---|---|---|---|---|---|---|
| 1 | CONTROL | 0 | * | * | * | 107 nm | 31 nm |
| 2 | pMMA | 5 | 11743 | 31156 | 2.65 | 105 nm | 30 nm |
| 3 | pMMA | 10 | 7196 | 22997 | 3.20 | 108 nm | 27 nm |

*Too high m. wt. to dissolve in solvent for GPC analysis

EXAMPLES 4 to 8

Examples 5 to 8 illustrate an emulsion process according to the present invention, with example 4 being the control. The same macromonomer as in Examples 2–3 were used, except that the pMMA chain transfer agent was introduced into the reaction either by direct addition at the beginning of the polymerization (all in the reactor) or added concurrentyl with the monomers over 90 minutes. The overall reaction composition, by weight, is again BMA/2EHMA/HEMA/MAA/methacrylamide/oligomeric pMMA according to the respective ratio of 30-X:61:3:3:3:X, wherein X varies in each example as shown in Table 2 below. In these examples, the polymerization initiator is the azo compound 4,4'-bis-azobis(4-cyanovaleric acid). The following components were employed.

|  | Parts by weight |
|---|---|
| Part 1 | |
| Demineralized water | 250.94 |
| TREM LF-40 | 1.33 |
| DUPANOL WAQE | 1.11 |
| Oligomeric pMMA (Examples 5 & 6) | X |
| Part 2 | |
| Demineralized water | 32.64 |
| 4,4'-bis-azobis (4-cyanovaleric acid) | 0.93 | into the monomeric feed vessel in order, without mixing. The contents of Part 3 are preemulsified and adjusted to an emulsion temperature of 80°–85° F. Polymerization is started by adding 5% of Part 3 into the reactor in a single shot. The reactor temperature is stabilized to 185°–187° F. and all of Part 2 (initiator solution) is added in a single shot. The temperature of the reactor will rise. When stable, the remainder of Part 3 is added over 90 minutes. The reactor temperature is controlled to 190°–194° F. At completion of Part 3 addition, the reactor is held at a temperature of 190°–194° F. for 60 minutes, cooled to 100° F., and Part 4 is added over 5 minutes.

The solids content ofthe product was 35.25%. The results for the polymer product obtained in each of examples 4–8 are shown in Table 2 below. This Table demonstrates the effectiveness of oligomeric chain transfer agents using a different water soluble polymerization initiator. Again the control (Example 4) provides a latex with unmeasurable molecular weight, but presumed to be above an $M_n$ of 100,000. Addition of the pMMA to the polymerization, either by placement in the reactor at the beginning of the process (Examples 5 and 6) or through continuous addition concurrent with other monomers (Examples 7 and 8), provides substantial molecular weight reduction. Particle size does not vary much above the control and in most cases found to be smaller than the control.

TABLE 2

BMA/23HMA/HEMA/MAA/METHACRYLAMIDE/OLIGOMERIC pMMA (BY WEIGHT)
30-X:61:3:3:3:X

| EXAMPLE | OLIGOMER CTA (Mn = 316; D = 1.31) | X | Location of CTA | Mn | Mw | Dispersity | Particle Size Mean diam. | St. Dev. |
|---|---|---|---|---|---|---|---|---|
| 4 | CONTROL | 0 |  | * | * | * | 144 nm | 24 nm |
| 5 | pMMA | 5 | Reactor | 11260 | 22063 | 1.96 | 166 nm | 56 nm |
| 6 | pMMA | 10 | Reactor | 12083 | 24181 | 2.00 | 112 nm | 37 nm |
| 7 | pMMA | 5 | Feed | 19237 | 59256 | 3.08 | 126 nm | 38 nm |
| 8 | pMMA | 10 | Feed | 6717 | 15760 | 2.35 | 115 nm | 25 nm |

*Too high m. wt. to dissolve in solvent for GPC analysis

EXAMPLES 9–10

These examples illustrate an emulsion process according to the present invention having a functional macromonomer, poly(hydroxyethyl methylacrylate) or pHEMA. The overall reaction composition, by weight, is BMA/2EHMA/MAA/methacrylamide/pHEMA, according to the respective ratio of 30:61:3:3:3, wherein 2EHMA is 2-ethylhexyl methacrylate, MMA is methyl methacrylate, and HEMA is hydroxyethyl methacrylate, and pHEMA is a poly(hydroxyethyl methacrylate) macromonomer chain transfer agent. The following components were employed.

|  | Parts by weight |
|---|---|
| Part 1 |  |
| Demineralized water | 250.40 |
| TREM LF-40 | 1.33 |
| DUPANOL WAQE | 1.11 |
| Part 2 |  |
| Demineralized water | 32.64 |
| Ammonium persulfate (Example 9) | 0.76 |
| 4,4'-azobis(4-cyano-valeric acid) (Example 10) | 0.93 |
| Part 3 |  |
| Butyl methacrylate | 90.52 |
| 2-Ethylhexyl methacrylate | 184.05 |
| Methacrylamide | 9.05 |
| Methacrylic Acid | 9.05 |
| pHEMA* | 12.57 |
| TREM LF-40 | 3.80 |
| DUPANOL WAQE | 3.11 |
| Demineralized water | 181.87 |
| Part 4 |  |
| Demineralized Water | 80.88 |
| TOTAL | 858.16 |

*72% in methylethyl ketone

Part 1 is charged into a 2 liter reactor, mixed to dissolve and heated to 185°–187° F. Part 2 is charged into an initiator feed vessel in order, mixed and dissolved. Part 3 is charged into the monomeric feed vessel in order, without mixing. The contents of Part 3 are preemulsified and adjusted to an emulsion temperature of 80°–85° F. Polymerization is started by adding 5% of Part 3 into the reactor in a single shot. The reactor temperature is stabilized to 185°–187° F. and all of Part 2 (initiator solution) is added in a single shot. The temperature of the reactor will rise. When stable, the remainder of Part 3 is added over 90 minutes. The reactor temperature is controlled to 190°–194° F. At completion of Part 3 addition, the reactor is held at a temperature of 190°–194° F. for 60 minutes, cooled to 100° F., and Part 4 is added over 5 minutes.

The solids content of the product is 34.07%. The results for the polymer product obtained are shown in Table 3 below. Table 3 demonstrates that the functionalized oligomeric chain transfer agent (PHEMA) can also perform as an effective chain transfer agent using either persulfate or azo polymerization initiators.

TABLE 3

BMA/2EHMA/MAA/METHACRYLAMIDE/OLIGOMERIC HEMA (BY WEIGHT)
30:61:3:3:3

| EXAMPLE | OLIGOMER CTA (Mn = 320; D = 1.24) | Initiator | | | | | Particle Size | |
|---|---|---|---|---|---|---|---|---|
| | | Grams | Type | Mn | Mw | Dispersity | Mean diam. | St. Dev. |
| 1 | CONTROL | 0.76 | Ammonium Persulfate | * | * | * | 107 nm | 31 nm |
| 9 | pHEMA | 0.76 | Ammonium Persulfate | 40983 | 209451 | 5.11 | 135 nm | 29 nm |
| 4 | CONTROL | 0.93 | AZO** | * | * | * | 144 nm | 24 nm |
| 10 | pHEMA | 0.93 | AZO** | 44915 | 406319 | 9.05 | 142 nm | narrow |

*Too high m. wt. to dissolve in solvent for GPC analysis
**4,4'-Bis-Azobis(4-Cyanovaleric Acid)

EXAMPLES 11 to 13

Examples 12 and 13, with Example 11 as a control, illustrate, according to the present method, the preparation of a polymer in an aqueous system, from MMA/STY/2EHA/HEA/MAA/METHACRYLAMIDE/OLIGOMERIC pMMA in the respective ratio, by weight, of 26.5-X:15:50:3.0:3.0:2.5:X, wherein MMA is methyl methacryate, STY is styrene, 2EHA is 2-ethylhexyl acrylate, HEA is hydroxy ethyl acrylate, MAA is methacrylic acid, and "oligomeric pMMA" is a poly(methyl methacrylate) macromonomer according to the present invention. The following components are employed in the polymerization.

| | Parts by weight |
|---|---|
| Part 1 | |
| Demineralized water | 250.94 |
| TREM LF-40 | 1.33 |
| DUPANOL WAQE | 1.11 |
| Part 2 | |
| Demineralized water | 32.64 |
| Ammonium persulfate | 0.76 |
| Part 3 | |
| Methyl methacrylate | 82.66-X |
| Styrene | 46.80 |
| 2-ethyl hexylacrylate | 156.00 |
| 2-hydroxy ethylacrylate | 9.36 |
| methacrylic acid | 9.36 |
| Oligomeric pMMA | X |
| Methacrylamide | 7.80 |
| TREM LF-40 | 3.80 |
| Dupanol WAQE | 3.11 |
| Part 4 | |
| Demineralized water | 181.87 |
| Demineralized Water | 79.00 |
| TOTAL | 783.88 |

Part 1 is weighed into a 2 liter reactor, mixed to dissolve and heated to 185°–187° F. The ingredients in Part 2 are loaded into a initiator feed pot in order, mixed and dissolved. Part 3 is loaded into the monomer feed vessel, in order as listed, without mixing. The contents of Part 3 are pre-emulsified and adjusted to an emulsion temperature of 80°–85° F. As soon as the emulsion is made, 5% of the monomer feed is dropped into the reactor in a single shot. The reactor temperature is stabilized to 185°–187° F. and all of Part 2 is added in a single shot. The reactor temperature will begin to raise in about 5 minutes. When the temperature begins to level out, the remainder of Part 3 is then added over 90 minutes. Temperature should be controlled to 190°–194° F. At the completion of the addition of Part 3, the temperature is held for 60 minutes and then cooled to 104° F. Part 4 is added into the feed vessel over 5 minutes.

The theoretical solids are 29.25%. The results are shown in Table 4 below and demonstrate that the oligomeric pMMA chain transfer agent can reduce the polymer molecular weight of polymers composed mostly of acrylate and styrene monomers.

TABLE 4

MMA/STY/2EHA/HEA/MAA/METHACRYLAMIDE/OLIGOMERIC MMA (BY WEIGHT)
26.5-X:15:50:3:3:2.5:X

| EXAMPLE | OLIGOMER CTA (Mn = 294; D = 1.24) | X | Initiator | | | | Particle Size | |
|---|---|---|---|---|---|---|---|---|
| | | | type | Mn | Mw | Dispersity | Mean diam. | St. Dev. |
| 11 | CONTROL | 0 | Ammonium Persulfate | * | * | * | 86 nm | narrow |
| 12 | pMMA | 5 | Ammonium Persulfate | 17054 | 44167 | 2.59 | 79.8 nm | 26 nm |

TABLE 4-continued

MMA/STY/2EHA/HEA/MAA/METHACRYLAMIDE/OLIGOMERIC MMA (BY WEIGHT)
26.5-X:15:50:3:3:2.5:X

| EXAMPLE | OLIGOMER CTA (Mn = 294; D = 1.24) | X | Initiator type | Mn | Mw | Dispersity | Particle Size Mean diam. | St. Dev. |
|---|---|---|---|---|---|---|---|---|
| 13 | pMMA | 10 | Ammonium Persulfate | 10015 | 23170 | 2.31 | 81.2 nm | narrow |

*Too high m. wt. to dissolve in solvent for GPC analysis

EXAMPLE 14

This example illustrates, according to the present method, the preparation of a polymer in an aqueous system, from MMA/STY/2EHA/HEA/MAA/N-Methylol-methacrylamide/oligomeric pMMA in the respective ratio, by weight, of 24:1:50:5.0:5.0:5:10, wherein MMA is methyl methacryate, STY is styrene, 2EHA is 2-ethylhexyl acrylate, HEA is hydroxy ethyl acrylate, MAA is methacrylic acid, and "oligomeric pMMA" is a poly(methyl methacrylate) macromonomer according to the present invention. The following components are employed in the polymerization.

|  | Parts by weight |
|---|---|
| Part 1 |  |
| Demineralized water | 878.29 |
| TREM LF-40 | 4.66 |
| POLYSTEP B1 | 3.33 |
| Part 2 |  |
| Demineralized water | 104.24 |
| Ammonium persulfate | 2.66 |
| Part 3 |  |
| Methyl methacrylate | 360.97-X |
| Styrene | 10.62 |
| 2-Ethylhexyl acrylate | 530.84 |
| 2-Hydroxyethyl acrylate | 53.08 |
| Methacrylic acid | 53.08 |
| pMMA macromonomer | X |
| N-methylol-methacrylamide | 88.47 |
| TREM LF-40 | 13.30 |
| POLYSTEP B1 | 9.31 |
| Demineralized water | 547.45 |
| Part 4 |  |
| Demineralized water | 10.01 |
| Ammonium persulfate | 1.50 |
| Part 5 |  |
| Aqueous ammonia (29%) | 19.96 |
| Biocide | 2.66 |
| Demineralized water | 369.96 |
| Total | 3064.38 |
| Solids Total | 1081.63 |
| Theoerical solids | 35.30 |

Part 1 is weighed into a 2 liter reactor, mixed to dissolve and heated to 185°–187° F. The ingredients in Part 2 are loaded into a initiator feed pot in order, mixed and dissolved. Part 2 is loaded into the monomer feed vessel, in order as listed, without mixing. The contents of Part 3 are pre-emulsified and adjusted to 80°–85° F. As soon as the emulsion is made, the monomer feed is dropped 5% into the reactor (setting at 185°–187° F.) in a single shot. The reactor temperature is stabilized to 185°–187° F. and all of part 2 is added in a single shot. The reactor temperature will begin to raise in about 5 minutes. When temperature begins to level out the remainder of Part 3 is begun to be added over 90 minutes. Temperature should be controlled to 190°–194° F. Part 4 is added to the reactor is a single shot 60 minutes after the start of Part 3. The results are shown in Table 5. This example demonstrates that modifications to the composition, including the use of the functionalized and reactive monomers n-methylol-methacrylamide in the process have little or no effect on the efficiency of the chain transfer agent. At the completion of Part 3 the temperature is held for 60 minutes and then cooled to 104° F. Part 5 is added into the feed vessel over 5 minutes.

TABLE 5

MMA/STY/2EHMA/HEA/MAA/N-METHYLOL-METHACRYLAMIDE/OLIGOMERIC MMA (BY WEIGHT)
24:1:50:5:5:5:10

| EXAMPLE | OLIGOMER CTA (Mn = 270; D = 1.15) | X | Initiator type | Mn | Mw | Dispersity | Particle Size Mean diam. | St. Dev. |
|---|---|---|---|---|---|---|---|---|
| 14 | PMMA | 10 | Ammonium Persulfate | 5391 | 14807 | 2.75 | 115 nm | 41 nm |

EXAMPLE 16

This example illustrates the preparation of a pMMA macromonomer chain transfer agent such as employed in the present invention. A reactor was equipped with a stirrer, thermocouple, and condenser. The reactor was held under nitrogen positive pressure and the following ingredients were employed.

|  | Parts by Weight |
|---|---|
| Part 1 | |
| Ethyl acetate | 248.66 |
| Methyl methacrylate | 499.07 |
| Part 2 | |
| Ethyl acetate | 87.25 |
| Catalyst* | 0.3540 |
| Part 3 | |
| Methyl methacrylate | 1996.71 |
| Part 4 | |
| VAZO 52 | 19.62 |
| Ethyl acetate | 848.33 |

*diaquobis(borondifluorodiphenyl-glyoximato) cobaltate (II)

Part 1 was charged to the reactor and heated to 80° C. When the temperature stabilized at 80° C., Part 2 was charged to the reactor as a single shot feed. Part 3 (the monomer feed) and Part 4 (the initiator feed) were added concurrently, except that Part 3 was added over 240 minutes and Part 4 was added over 300 minutes. When the initiator feed in complete, the reaction mixture is held for 30 minutes. The solvent and unreacted monomer are then distilled off.

EXAMPLE 17

This example illustrates the preparation of a EMA/BMA macromonomer chain transfer agent such as employed in the present invention, wherein EMA is ethyl methacrylate and BMA is butyl methacrylate. A reactor was equipped with a stirrer, thermocouple, and condensor. The reactor was held under nitrogen positive pressure and the following ingredients were employed.

|  | Parts by Weight |
|---|---|
| Part 1 | |
| Ethyl acetate | 248.66 |
| Ethyl methacrylate | 250.00 |
| Butyl methacrylate | 250.00 |
| Part 2 | |
| Ethyl acetate | 87.25 |
| Catalyst* | 0.3540 |
| Part 3 | |
| Ethyl methacrylate | 998.36 |
| Butyl methacrylate | 998.36 |
| Part 4 | |
| VAZO 52 | 19.62 |
| Ethyl acetate | 648.33 |

*diaquobis(borondifluorodiphenyl-glyoximato) cobaltate (II)

|  | Parts by Weight |
|---|---|
| Part 1 was charged to the reactor and heated to 80° C. When the temperature stabilized at 80° C., Part 2 was charged to the reactor as a single shot feed. Part 3 (the monomer feed) and Part 4 (the initiator feed) were added concurrently, except that Part 3 was added over 240 minutes and Part 4 was added over 300 minutes. When the initiator feed in complete, the reaction mixture is held for 30 minutes. The solvent and unreacted monomer are then distilled off. | |

EXAMPLE 18–19

These examples illustrate acrylic polymerization of a reaction mixture of STY/nBA/HPA/pMMA oligomer, in the respective ratio of 15:30-X:17:38:X, where STY is styrene monomer, nBA is n-butyl acrylate, HPA is hydroxypropylacrylate, and pMMA is a poly(methyl methacrylate) w-unsaturated macromonomer chain transfer agent. The following components were used:

|  | Parts by Weight |
|---|---|
| Part 1 | 195.70 |
| Hexylacetate | |
| Part 2 | |
| n-Butyl methacrylate | 174.3-X |
| Styrene | 87.15 |
| n-Butyl acrylate | 97.34 |
| Hydroxypropyl acrylate | 222.21 |
| p(MMA) macromonomer | X |
| Hexylacetate | 1.31 |
| Part 3 | |
| VAZO 67 | 18.35 |
| Hexylacetate | 30.02 |

Part 1 is charged to a reactor equipped with a stirrer, thermocouple, nitrogen positive pressure and a condenser. The reaction mixture is heated to 110° C. Part 2 is charged to the monomer vessel and added to the reactor over 360 minutes. Part 3 is charged to an initiated feed vessel, premixed, and added to the reactor over 375 minutes concurrenly with the monomer feed. Following completion of the initiator feed, the reaction mixture is held for 60 minutes. The results are shown in Table 6 below.

TABLE 6

| | pMMA Oligomer Added for nBMA | Mol. Wt. | | |
|---|---|---|---|---|
| Example | (%/Grams) | $M_w$ | $M_n$ | D |
| 18 | control | 19620 | 8385 | 2.34 |
| 19 | 10%/58.10 gms | 15095 | 6769 | 2.23 |

EXAMPLES 20–23

These examples illustrate the preparation of a copolymer made from a mixture of STY/HEMA/IBMA/MMA/pMMA oligomer in the respective ratio of 15:20:45:20-X:X, wherein STY is styrene, HEMA is hydroxyethyl methacrylate, IBMA is isobutyl methacrylate, and MMA is methyl methacrylate monomer. The oligomer pMMA is poly(methyl methacrylate) which is a w-unsaturated macromonomer chain transfer agent.

| Ingredients | Parts by Weight |
|---|---|
| Part 1 | |
| BUAC | 885.71 |
| MMA oligomer | X |
| Part 2 | |
| Styrene | 306.05 |
| HEMA | 408.07 |
| IBMA | 918.15 |
| MMA | 408.07-X |
| BUAC | 61.21 |
| Part 3 | |
| POIB | 59.17 |
| BUAC | 230.56 |
| Part 4 | |
| POIB | 18.98 |
| MEK | 204.03 |

In the above list, BUAC stands for butyl acetate, HEMA stands for hydroxyethyl methacrylate, IBMA stands for isobutyl methacrylate monomer. MEK stands for methyl ethyl ketone solvent and POIB stands for t-butylperoxyisobutyrate (80% in mineral spirits). Part 1 is added to a reactor equipped with a condenser, stirrer, nitrogen purge, feed system, heating mantle, and heated to reflux. Part 2 is premixed and fed to the reactor over 3 hours simultaneously with Part 3. Part 3 is premixed and fed to the reactor over 3 hours simultaneously with Part 2. After Parts 2 and 3 have been added, the contents of Part 4 are premixed and fed to the reactor over 1 hours. The mixture is held 1 hour at reflux. A summary of the results is shown in Table 7.

TABLE 7

| Resin | % MMA Monomer | % Conversion | $M_n$ | $M_w$ | D | Gardner-Holtz Visc. |
|---|---|---|---|---|---|---|
| Control 20 | 0 | 100 | 6912 | 16,231 | 2.35 | Z-2 |
| Example 21 | 2.5%/51.0 gms | 99 | 5749 | 11,867 | 2.06 | Y |
| Example 22 | 3.5%/71.4 gms | 99 | 5045 | 10,488 | 2.08 | X |
| Example 23 | 5.0%/102.0 gms | 99 | 4811 | 9,173 | 1.91 | W + ½ |

EXAMPLES 24–25

This example illustrates the preparation of a hydroxy functional polymer employing an ethyl methacrylate macromonomer as a chain transfer agent. For the control, the following components were used:

| | Parts by Weight |
|---|---|
| Part 1 | |
| MAK | 439.45 |
| Part 2 | |
| STY | 441.19 |
| EMA | 441.19 |
| LMA | 353.02 |
| HEA | 529.30 |
| Part 3 | |
| MAK | 108.60 |
| TBPA | 35.29 |
| Part 4 | 202.22 |
| MAK | |

In the above list, LMA stands for lauryl methacrylate, MAK stands for methyl amyl ketone, and TBPA stands for t-butyl peroxyacetate (75% in mineral spirits). Part 1 is charged to a 5 liter flask and heated to reflux at 149°–154° C. Part 2 is premixed and added at a constant rate over 300 minutes with Part 3. Part 3 is also premixed and added with Part 2 at a constant rate over 310 minutes. After completing the addition of Parts 2 and 3, the reaction mixture is held under reflux 30 miuntes at 145°–155° C. Finally, Part 4 is added and the mixture cooled to 55°–60° C.

As an example of employing, according to the present invention 5% ethyl methacrylate macromonomer as a chain transfer agent, the following components were used:

| | Parts by Weight |
|---|---|
| Part 1 | |
| MAK | 465.41 |
| EMA macromonomer | 46.72 |
| Part 2 | |
| STY | 467.26 |
| EMA | 373.51 |
| LMA | 373.88 |
| HEA | 560.57 |
| EMA macromonomer | 46.72 |
| Part 3 | |
| MAK | 115.02 |
| TBPA | 35.44 |
| Part 4 | 214.15 |
| MAK | |

Part 1 is charged to a 5 liter flask and heated to reflux at 149°–154° C. Part 2 is premixed and added at a constant rate over 300 minutes with Part 3. Part 3 is premixed and added with Part 2 at a constant rate over 310 minutes. After the completion of addition of Parts 2 and 3, the reaction mixture is held under reflux for 30 minutes at 145°–155° C. Part 4 is added and the mixture cooled to 55°–60° C. The results are shown in Table 8 below:

TABLE 8

| | pEMA macro | Mol. Wt. | | Gardner-Holtz |
|---|---|---|---|---|
| Example | Wt % on Monomer | $M_w$ | $M_n$ | Viscosity |
| 24 | control | 17157 | 5536 | Z3 |
| 25 | 5.0% | 13504 | 4134 | Z1 |

The best mode presently contemplated for carrying out the invention is represented by the disclosure and claims herein, it being understood that selection of the best mode will depend on a variety of factors, including the monomers being polymerized, the particular chain transfer agent and the initiator employed, and the amounts thereof, and the polymerization conditions, such as temperature, pressure, conversion and yield.

We claim:

1. A method of free radical polymerization of unsaturated monomers to make a polymer having reactive functionality, comprising reacting:

(a) for chain transfer, a macromonomer, or a molecular weight distribution of macromonomers, having the following end group:

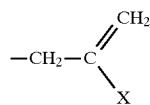

wherein:
    X is independently selected from at least one of —$CONR_2$, —COOR, $OR^1$, —OCOR, —$OCOOR^1$, —$NRCOOR^1$, halo, cyano, and a substituted aryl;
    R is independently selected from the group consisting of hydrogen, silyl, substituted alkyl, alkyl ether, substituted benzyl and substituted aryl, wherein substituted means with a substituent selected from the group consisting of epoxy, hydroxy, isocyanato, cyano, amino, silyl, acid, halo, and acyl;
    $R^1$ is the same as R except not H; and
    each alkyl is independently selected from the group consisting of branched, unbranched, or cyclical hydrocarbons having 1 to 12 carbon atoms; and halo is bromo, iodo, chloro or fluoro; except excluding the use of pure dimer when X is substituted aryl and excluding macromonomers in which X is $COOCH_3$; with (b) a mixture of monomers, the same or different, at least a portion of which have a reactive functionality which, on the polymerization product, is capable of crosslinking with itself or another polymer; and (c) forming a polymer wherein substantially all terminal groups are

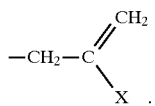

2. The method of claim 1, wherein the functionality in (b) is selected from the group consisting of hydroxyl, epoxy, anhydride, carboxyl, silyl, amide, amino, and isocyanato functionalities.

3. The method of claim 1, wherein polymerization is conducted in the presence of an effective amount of a macromonomer, or molecular weight distribution of macromonomers, having the following formula:

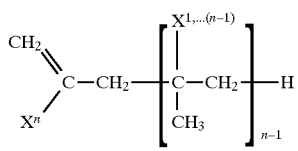

wherein n is on average 2 to 100.

4. The method of claim 1, wherein polymerization is conducted in the presence of a macromonomer, or molecular weight distribution of macromonomers, in which X is —$CONR_2$, —COOR, or substituted aryl, and R is as defined above.

5. The method of claim 1, wherein polymerization is conducted in the presence of a macromonomer, or molecular weight distribution of macromonomers, in which X is —COOR or phenyl and R is alkyl or phenyl, each of X and Y being substituted with a member selected from the group consisting of epoxy, hydroxy, silyl and acid.

6. The method of claim 1, wherein polymerization is conducted in the presence of an effective amount of a macromonomer, or molecular weight distribution of macromonomers, having the following formula:

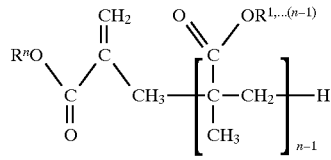

wherein n is, on average, 2 to 20 and $R^1$ to $R^n$ are each independently selected from the group consisting of hydrogen, substituted alkyl, alkyl ether, phenyl, benzyl, or aryl, which substituent is selected from the group consisting of epoxy, hydroxy, isocyanato, cyano, amino, silyl, acid, anhydride, halo, or acyl; and each alkyl is independently selected from the group consisting of branched, unbranched, or cyclical hydrocarbons having 1 to 12 carbons, halo is selected from the group consisting of bromo, iodo, chloro and fluoro, and silyl is —$SiR^2(R^3)(R^4)$, wherein $R^2$, $R^3$, and $R^4$ are independently alkyl, phenyl, alkyl ether, or phenyl ether, wherein alkyl is as defined above.

7. The method of claim 1, wherein the mixture of monomers includes macromonomers.

8. The method of claim 1, wherein the polymerization is carried out at 20° to 200° C.

9. The method of claim 1, wherein the polymerization is carried out in the presence of an free radical initiator.

10. The method of claim 9, wherein the initiator is an azo or peroxide containing compound.

11. The method of claim 1, wherein a mixture of different monomers is copolymerized.

12. The method of claim 1, wherein the number average molecular weight per functional group on the polymer is 70 to 6000.

13. The method of claim 1, wherein the number average molecular weight per functional group on the polymer is 200 to 2000.

14. The method of claim 1, wherein the macromonomer chain transfer agents employed in the present invention have a distribution of molecular weights and have a degree of polymerization ranging from 2 to 100.

15. The method of claim 14, wherein the macromonomer chain transfer agents employed in the present invention have a distribution of molecular weights and have a degree of polymerization ranging from 2 to 20.

16. The method of claim 1 wherein n is on average 2 to 7.

17. The method of claim 1, wherein the macromonomers are substantially pure.

18. The method of claim 1, wherein the macromonomer is comprised of alkyl methacrylate wherein the alkyl has 1 to 10 carbon atoms.

19. The method of claim 1 wherein the macromonomer is comprised of monomer units selected from the group consisting of methyl, ethyl, propyl and butyl methacrylate; fluorinated alkyl methacrylates, alpha-methyl styrene, hydroxyethyl methacrylate, glycidyl methacrylate, methacrylic acid, methacrylonitrile, or combinations thereof.

20. The method of claim 1, wherein the macromonomer or distribution of macromonomers are the product of a metal chelate chain transfer process.

21. The method of claim 1, wherein the effective amount of macromonomer is in the range of between 0.01% and 80% by weight of the monomers present.

22. The method of claim 21, wherein the effective amount is between 1 and 20% by weight.

23. The method of claim 22, wherein the macromonomer is an epoxy, silyl, or hydroxy functional oligomer.

24. The method of claim 1, wherein the polymer produced is selected from telechelical polymer, a pseudo-telechelic polymer, and a macromolecule.

25. A method of claim 24 for free radical polymerization of unsaturated monomers to make a telechelic polymer having terminal functionality, wherein the reaction mixture comprises:

(a) for chain transfer, a macromonomer, or a molecular weight distribution of macromonomers, having the following end group:

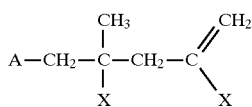

where A is H or an initiator fragment; X is independently selected from at least one of —CONR$_2$, —COOR$^1$, OR$^1$, —OCOR, —OCOOR$^1$, —NRCOOR$^1$, cyano, or a substituted aryl, wherein each R is independently selected from the group consisting of hydrogen, silyl, or a substituted alkyl, alkyl ether, phenyl, benzyl, and aryl, wherein substituted means with a substituent selected from the group consisting of epoxy, hydroxy, isocyanato, cyano, amino, silyl, acid, anhydride, or acyl; and wherein R$^1$ is the same as R except not H; and wherein each alkyl is independently selected from the group consisting of branched, unbranched, or cyclical hydrocarbons having 1 to 12 carbon atoms; and (b) a mixture of monomers, the same or different wherein the polymerization product, or a substantial portion of the polymerization product, has a terminal functionality, at one or both ends, which functionality is selected from the group consisting of epoxy, hydroxy, isocyanato, cyano, amino, silyl, acid, anhydride or acyl which group is capable of crosslinking with a functionality on a separate polymer or crosslinking agent.

26. The method of claim 25, wherein polymerization is conducted in the presence of an effective amount of a macromonomer, or molecular weight distribution of macromonomers, having the following formula:

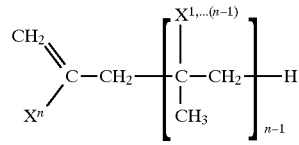

wherein n is on average 2 to 100.

27. The method of claim 1, wherein the polymer is a terminally functionalized macromolecule having a degree of polymerization ranging from 10 to 50.

28. The method of claim 27 comprising employing the macromonomer in a non-aqueous dispersed polymer, a microgel, a star polymer, a branched polymer, a ladder polymer, or a block polymer.

29. The method of claim 1, wherein a block copolymer is produced, wherein polymerization of a desired monomer composition for a block is carried out in the presence of an effective amount of said macromonomer, which macromonomer is made from monomers required for one of the other blocks in the block polymer.

30. The method of claim 29, wherein the macromonomer chain transfer agent has a desired degree of polymerization determined by the desired block size of that composition.

* * * * *

UNITED STATES PATENT AND TRADEMARK OFFICE
CERTIFICATE OF CORRECTION

PATENT NO. : 5,773,534
DATED : June 30, 1998
INVENTOR(S) : Joseph A. Antonelli et al.

It is certified that error appears in the above-identified patent and that said Letters Patent is hereby corrected as shown below:

Column 26, Claim 6, the formula

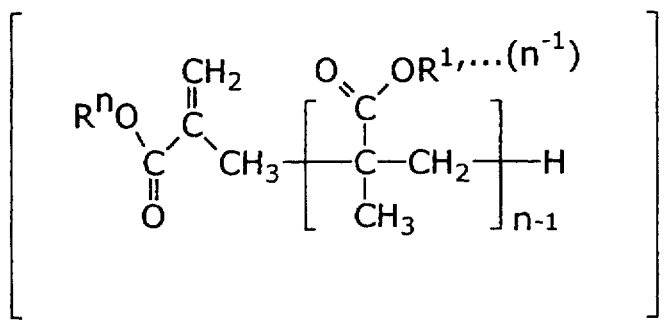

Cont.

UNITED STATES PATENT AND TRADEMARK OFFICE
CERTIFICATE OF CORRECTION

PATENT NO. : 5,773,534
DATED : June 30, 1998
INVENTOR(S) : Joseph A. Antonelli et al It is certified that error appears in the above-identified patent and that said Letters Patent is hereby corrected as shown below:

should be deleted and in its place the following formula should be added therefor

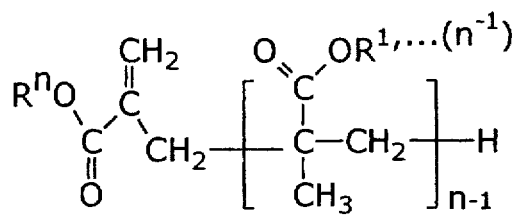

Signed and Sealed this

Seventeenth Day of August, 1999

Attest:

Q. TODD DICKINSON

Attesting Officer      Acting Commissioner of Patents and Trademarks